(12) United States Patent
Laigle et al.

(10) Patent No.: US 9,845,706 B2
(45) Date of Patent: Dec. 19, 2017

(54) LUBRICATION SYSTEM FOR A TURBOPROPELLER

(71) Applicant: SNECMA, Paris (FR)

(72) Inventors: Antoine Laigle, Paris (FR); Jean-Louis Muller, Maisons-Alfort (FR)

(73) Assignee: SNECMA, Paris (FR)

( * ) Notice: Subject to any disclaimer, the term of this patent is extended or adjusted under 35 U.S.C. 154(b) by 649 days.

(21) Appl. No.: 14/199,577

(22) Filed: Mar. 6, 2014

(65) Prior Publication Data
US 2014/0255171 A1   Sep. 11, 2014

(30) Foreign Application Priority Data
Mar. 6, 2013 (FR) ...................... 13 51988

(51) Int. Cl.
*F02C 7/06* (2006.01)
*F01D 25/20* (2006.01)

(52) U.S. Cl.
CPC ............... *F01D 25/20* (2013.01); *F02C 7/06* (2013.01); *F05D 2260/79* (2013.01); *F05D 2260/98* (2013.01); *Y02T 50/671* (2013.01)

(58) Field of Classification Search
CPC ......... F01D 25/20; F02C 7/06; F05D 2260/98
See application file for complete search history.

(56) References Cited

U.S. PATENT DOCUMENTS

| | | | | |
|---|---|---|---|---|
| 4,020,632 A | * | 5/1977 | Coffinberry | F02C 7/14 123/41.33 |
| 4,446,696 A | * | 5/1984 | Sargisson | F02C 6/206 60/226.3 |
| 4,905,644 A | * | 3/1990 | Masclet | B01D 35/147 123/196 A |
| 5,610,341 A | * | 3/1997 | Tortora | F01D 17/02 73/756 |
| 9,046,002 B2 | * | 6/2015 | Homeyer | F01D 21/00 |

FOREIGN PATENT DOCUMENTS

| | | |
|---|---|---|
| DE | 102011012863 | 9/2012 |
| EP | 1 160 419 | 12/2001 |
| FR | 2 925 110 | 6/2009 |
| FR | 2 967 467 | 5/2012 |

OTHER PUBLICATIONS

Search Report and Written Opinion as issued for French Patent Application No. 1351988, dated Dec. 23, 2013.

* cited by examiner

*Primary Examiner* — Matthew W Jellett
(74) *Attorney, Agent, or Firm* — Pillsbury Winthrop Shaw Pittman LLP

(57) ABSTRACT

A lubrication system for a turbopropeller, includes an oil feed device for at least one enclosure and one equipment, the equipment being connected to the feed device via a displacement pump, and a pressure restricting valve mounted downstream of displacement pump and in parallel to the equipment, such that oil flows through the equipment when the same is active, and through the valve when the equipment is inactive.

14 Claims, 1 Drawing Sheet

1 …

LUBRICATION SYSTEM FOR A TURBOPROPELLER

CROSS-REFERENCE TO RELATED APPLICATIONS

This application claims priority to French Patent Application No. 1351988, filed Mar. 6, 2013, the entire content of which is incorporated herein by reference in its entirety.

FIELD

The technical field of the invention is that of turbopropellers. A turbopropeller includes a turbomachine and at least one propeller, the turbomachine being capable of rotatably driving the propeller. A turbopropeller also includes a system for managing the pitch of the propeller, enabling the pitch setting movement of the propeller blades to be managed.

The present invention relates to a system for lubricating a propeller enabling enclosures as well as the pitch actuating system to be lubricated.

BACKGROUND

A turbopropeller conventionally includes:
a turbomachine including a combustion chamber, and enclosures, in particular enclosures for roller bearings,
a propeller enclosure including a speed reducer,
at least one propeller rotatably driven by the turbomachine,
a pitch actuating system for managing the pitch setting of the propeller vanes.

The various enclosures and the pitch actuating system are lubricated via a lubrication system including an oil feed device, the feed device comprising at least one feed pump. The lubrication system also includes an assembly of scavenge pumps to scavenge oil downstream of the enclosures and the pitch actuating system, as well as exchangers to cool oil by heat exchange with fuel or air.

The terms upstream and downstream are to be taken into consideration with respect to an oil flow direction from the feed device to the enclosures and the pitch actuating system, wherein the oil flows from upstream to downstream.

A representative scheme of a first lubrication system 10 of a turbopropeller according to prior art is illustrated in FIG. 1. The lubrication system 10 includes an oil feed device 11 comprising a feed pump 15. The lubrication system also includes an assembly of scavenge pumps and heat exchangers 12. The lubrication system 10 is used to lubricate at least one enclosure 13 and a pitch actuating system 14. The enclosure 13 and the pitch actuating system 14 are thus connected to the feed pump 15 of the feed device 11. The feed pump 15 is a displacement pump which will be referred to as "feed pump 15" hereinafter. Part of the flow rate is used to lubricate the enclosure 13, another part is used to lubricate the pitch actuating system 14: the enclosure 13 and the pitch actuating system 14 are said to be fed in parallel. In the case of a plurality of enclosures to be lubricated, the enclosures are fed in parallel two by two, and the total flow rate of the feed pump 15 is shared between the multiple enclosures 13 and the pitch actuating system 14.

It is noted that the pitch actuating system 14 is an equipment operating under high pressure. The pressure at the pitch actuating system 14 is higher than the pressure at an enclosure 13. Thus, a pump 16 located upstream of the pitch actuating system 14, referred to as "pump of the pitch actuating system 16", supplies oil at the pitch actuating system 14. The pump of the pitch actuating system 16 is a displacement pump and is placed between the feed pump 16 and the pitch actuating system 14. The pump of the pitch actuating system 16 is a displacement pump, its flow rate is sized to the maximum flow rate potentially required by the pitch actuating system 14.

A pressure restricting valve 17 placed in parallel to the pump of the pitch actuating system 16 enables the oil flux to be redirected from downstream of the pump of the pitch actuating system 16 to upstream of the pump of the pitch actuating system 16. This valve 17 is partly or wholly closed when the pitch actuating system 14 is active, that is when a pitch change is demanded, to enable the pitch actuating system to be lubricated. On the contrary, the valve 17 is wholly opened when the pitch actuating system 14 is inactive to enable the oil flux to be redirected.

On the other hand, the sizing of the feed pump 15, that is the calibration of the oil flow rate of the feed pump 15, is performed hypothesizing that there are simultaneous maximum flow rates in the enclosure 13 and in the pitch actuating system 14. This results in the following problem; when the pitch actuating system 14 is inactive, the pump of the pitch actuating system 16 operates all the same and the oil flow rate provided for the pitch actuating system 14 is redirected upstream of the pump of the pitch actuating system 16. The oil flow rate pumped by the feed pump 15 provided for the pitch actuating system 14 is thus redirected to the enclosures 13, in addition to the flow rate provided for the enclosures 13. This overflow rate creates warming of oil in the enclosure 13 through churning, which makes oversizing of the heat exchanger 12 necessary.

A second lubrication system 20 according to prior art is illustrated in FIG. 2, Elements identical to those of the first lubrication system 10 bear the same reference numerals as in FIG. 1. The second lubrication system 20 enables overflow rate drawbacks of the previously described first lubrication system 10 to be avoided. The feed device 21 of the second lubrication system 20 includes two feed pumps 22, 23. The first feed pump 22 is a displacement pump sized on the maximum flow rate potentially required by the enclosure 13, whereas the second feed pump 23 is a centrifugal pump dedicated to the feed of the pitch actuating system 14. Two distinct feed branches 24, 25 are thus used to lubricate the pitch actuating system 14 and the enclosure 13, which avoids overflow rate problems in the enclosure 13 when the pitch actuating system 14 is inactive.

However, the second lubrication system 20 comprises a further feed pump and further pipings, which negatively impacts the mass and volume of the system.

SUMMARY

An aspect of the invention offers a solution to the previously discussed problems, by providing a lubrication system of at least one enclosure and one pitch actuating system, using a single oil feed pump to lubricate both elements, and enabling an oil overflow rate to be avoided in the enclosure when the pitch actuating system is inactive.

An embodiment of the invention thus relates to a lubrication system for a turbopropeller, including an oil feed device for at least one enclosure and one equipment, the equipment being connected to the feed device via a displacement pump, the lubrication system including a valve mounted downstream of the displacement pump and in parallel to the equipment, such that the oil partly flows through the equipment when the same is active, and wholly through the valve when the equipment is inactive.

More precisely, an embodiment of the invention relates to a lubrication system for a turbopropeller, including:
- an oil feed device for at least one enclosure and one equipment, wherein the enclosure can be connected to the feed device such that part of the oil from the feed device is withdrawn to feed the enclosure,
- a displacement pump, wherein the equipment can be connected to the feed device via the displacement pump.

The lubrication system includes a pressure restricting valve mounted downstream of the displacement pump, wherein the equipment can be mounted in parallel to the valve such that oil flows through the equipment when the same is active, and through the valve when the equipment is inactive.

Part of the oil from the feed device is withdrawn so as to feed the enclosure. In other words, the equipment and the enclosure are fed in parallel: part of the oil from the feed device is directed to the enclosure, and another part is directed to the equipment.

By virtue of the invention, the valve is used to redirect the flow rate which is not consumed by the equipment—the equipment being beneficially a pitch actuating system—to an oil scavenge circuit, instead of redirecting this flow rate to the enclosure. Thus, an overflow rate into the enclosure is avoided.

Besides the characteristics just discussed in the preceding paragraph, the lubrication system according to an embodiment of the invention can have one or more further characteristics among the following ones, considered singly or according to any technically possible combinations:
- the lubrication system includes at least one exchanger to cool oil;
- the oil is cooled in the exchanger by heat exchange with air or fuel used by the turbopropeller. The air used, external or coming from some parts of the engine, or the fuel have indeed a lower temperature than the oil in the exchanger;
- the oil downstream of the exchanger is redirected to the feed device. The lubrication system thus operates in closed circuit: the oil not consumed by the enclosure and the equipment is reused by the feed device;
- the oil feed device includes a feed pump, the feed pump being a displacement pump calibrated on the sum of the maximum flow rates potentially required to lubricate the enclosure and the equipment. A single feed pump is thus desired to lubricate the enclosure and the equipment. The calibration described enables the enclosure and the equipment to be simultaneously fed, even when they need simultaneously a high oil flow rate;
- the displacement pump upstream of the equipment is calibrated on the maximum flow rate potentially required to lubricate the equipment. This calibration enables a sufficient oil flow rate to be provided to the pitch actuating system, even when the latter needs a high oil flow rate;
- the passive valve is beneficially tared so as to limit the pressure upstream of the equipment while ensuring a minimum pressure for the same to operate properly;
- the equipment is a pitch actuating system.

An aspect of the invention also relates to a turbopropeller including a lubrication system according to an embodiment of the invention.

The invention and its different applications will be better understood upon reading the following description and upon examining the accompanying figures.

BRIEF DESCRIPTION OF THE FIGURES

The figures are only presented by way of indicating purposes and in no way limiting to the invention. The figures show.

DETAILED DESCRIPTION

Figure 1:
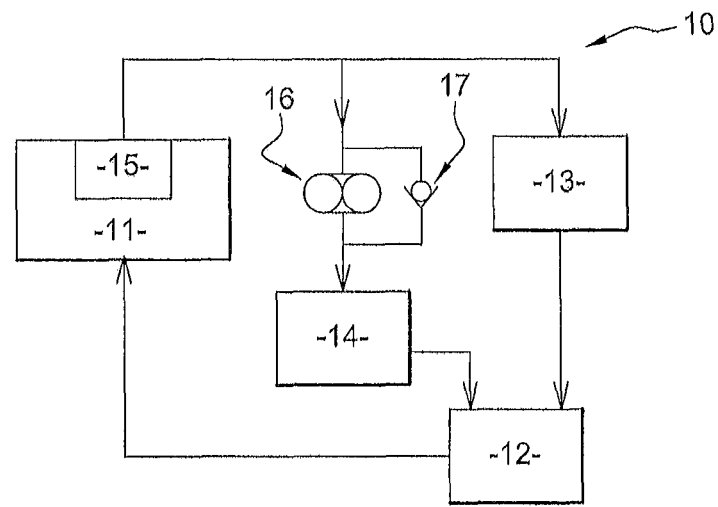
In FIG. 1, already described, a schematic representation of a lubrication system according to a first embodiment of prior art.
Figure 2:
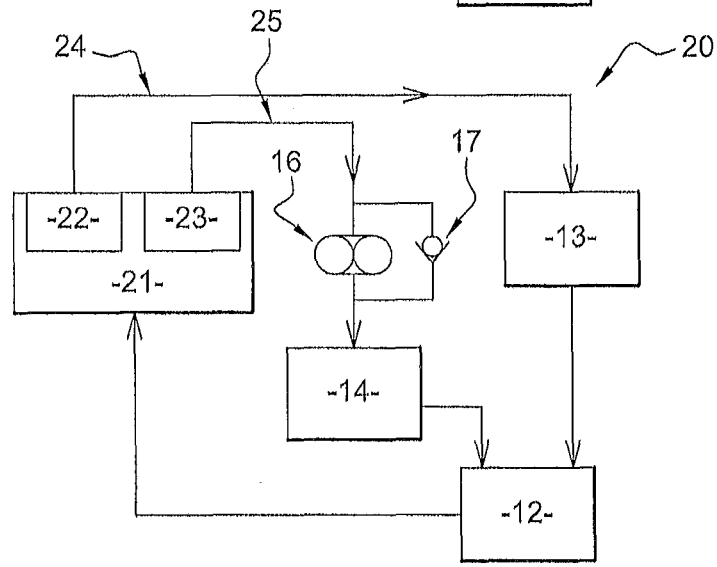
In FIG. 2, already described, a schematic representation of the lubrication system according to a second embodiment of prior art.
Figure 3:
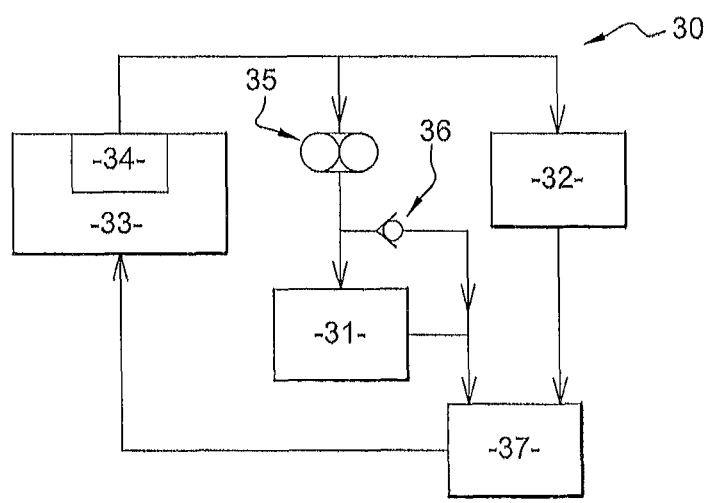
In FIG. 3, a schematic representation of the lubrication system according to an embodiment of the invention.

An embodiment of the lubrication system 30 for a turbopropeller is illustrated in FIG. 3. The lubrication system 30 aims at lubricating a pitch actuating system 31 and at least one enclosure 32.

The lubrication system 30 includes:
- an oil feed device 33, including a feed pump 34;
- a displacement pump 35 enabling the pitch actuating system 31 to be connected to the oil feed device 33. This pump 35, referred to as "the pump of the pitch actuating system 35" is a displacement pump, which means that its flow rate is proportional to its rotation speed;
- a valve 36 mounted downstream of the pump of the pitch actuating system 35, in parallel to the pitch actuating system 31. This valve 36 opens as a function of a pressure difference, for example upstream/downstream, but which could be upstream/external, downstream/external, etc. The valve 36 is passive;
- at least one exchanger 37 which is, in the non-limiting embodiment described, downstream of the pitch actuating system 31 and of the enclosure 32;
- a plurality of pipings connecting the various elements to each other.

In this arrangement, the enclosure 32 and the pitch actuating system 31 are fed by a single feed pump 34, and share the flow rate thereof. The enclosure 32 and the pitch actuating system 31 are thus fed in parallel. It is noted that in other embodiments, the lubrication system 30 is suitable for lubricating further enclosures, which are mounted in parallel to each other, and to the enclosure 32 and the pitch actuating system 31, in this case, the flow rate of the feed pump 34 is shared between the multiple enclosures and the pitch actuating system 31.

The feed pump 34 is a displacement pump calibrated on the sum of the maximum flow rates potentially required to lubricate the enclosure 32 and the pitch actuating system 31. This enables the enclosure 32 and the pitch actuating system 31 to be simultaneously fed regardless of their oil needs, that is even when the maximum flow rates necessary for these independent elements are simultaneously required.

When the pitch actuating system 31 is active, that is when a pitch setting of the blades of a propeller of the turbopropeller is required, oil pumped by the pump of the pitch actuating system 35 passes through the pitch actuating system 31, the lubricant. In this case, the valve 36 is wholly or partly closed. On the contrary, when the pitch actuating system 31 is inactive, oil pumped by the pump of the pitch actuating system 35 is directed to the valve 36, the valve 36 being open.

By virtue of the arrangement, the enclosure consumes a constant oil flow rate in any point of the regimen. Thus, a good lubrication of the enclosure is ensured while avoiding further heat rejections related to a churning in the enclosure.

Furthermore, the pressure downstream of the valve 36, that is upstream of the exchanger 37, is lower than the feed pressure upstream of the pump of the pitch actuating system 35. The valve 36 is thus beneficially tared so as to redirect the extra flow rate not consumed by the pitch actuating system 31 to the exchanger 37.

The invention claimed is:

1. A lubrication system for a turbopropeller, comprising:
an oil feed device for at least one enclosure and at least one equipment, wherein the at least one enclosure is connectable to the oil feed device such that part of the oil from the oil feed device is withdrawn to feed the at least one enclosure;
a displacement pump, wherein the at least one equipment is connectable to the oil feed device via the displacement pump, the at least one enclosure mounted in parallel to said displacement pump, and
a pressure restricting valve mounted downstream of said displacement pump, wherein the at least one equipment is mounted in parallel to said pressure restricting valve so that an outlet of the pressure restricting valve is connected to an outlet of the at least one equipment such that oil exiting the displacement pump flows (a) through the at least one equipment and then to a location downstream of the pressure restricting valve and of the at least one equipment when the at least one equipment is active, and (b) wholly through the pressure restricting valve and then to said location downstream of the pressure restricting valve and of the at least one equipment when the at least one equipment is inactive, at least one exchanger to cool oil at said location downstream of the pressure restricting valve and of the at least one equipment.

2. The lubrication system according to claim 1, wherein the oil is cooled in the at least one exchanger by heat exchange with air or with fuel used by the turbopropeller.

3. The lubrication system according to claim 1, wherein oil downstream of the at least one exchanger is redirected to the oil feed device.

4. The lubrication system according to claim 1, wherein the oil feed device includes a feed pump, said feed pump being another displacement pump calibrated on the sum of the maximum flow rates potentially required to lubricate the at least one enclosure and the at least one equipment.

5. The lubrication system according to claim 1, wherein the displacement pump upstream of the at least one equipment is calibrated on the maximum flow rate required to lubricate the at least one equipment.

6. The lubrication system according to claim 1, wherein the pressure restricting valve is tared so as to ensure a minimum pressure level at the terminals of the at least one equipment.

7. The lubrication system according to claim 1, wherein the at least one equipment is a pitch actuating system.

8. A turbopropeller including a lubrication system that comprises:
an oil feed device for at least one enclosure and at least one equipment of the turbopropeller, wherein the at least one enclosure is connected to the oil feed device such that part of the oil from the oil feed device is withdrawn to feed the at least one enclosure;
a displacement pump, wherein the at least one equipment is connected to the oil feed device via the displacement pump, the at least one enclosure mounted in parallel to said displacement pump, and
a pressure restricting valve mounted downstream of said displacement pump, wherein the at least one equipment is mounted in parallel to said pressure restricting valve so that an outlet of the pressure restricting valve is connected to an outlet of the at least one equipment such that oil exiting the displacement pump flows (a) through the at least one equipment and then to a location downstream of the pressure restricting valve and of the at least one equipment when the at least one equipment is active, and (b) wholly through the pressure restricting valve and then to said location downstream of the pressure restricting valve and of the at least one equipment when the at least one equipment is inactive, at least one exchanger to cool oil at said location downstream of the pressure restricting valve and of the at least one equipment.

9. The turbopropeller according to claim 8, wherein the oil is cooled in the at least one exchanger by heat exchange with air or with fuel used by the turbopropeller.

10. The turbopropeller according to claim 8, wherein oil downstream of the at least one exchanger is redirected to the oil feed device.

11. The turbopropeller according to claim 8, wherein the oil feed device includes a feed pump, said feed pump being another displacement pump calibrated on the sum of the maximum flow rates required to lubricate the at least one enclosure and the at least one equipment.

12. The turbopropeller according to claim 8, wherein the displacement pump upstream of the at least one equipment is calibrated on the maximum flow rate required to lubricate the at least one equipment.

13. The turbopropeller system according to claim 8, wherein the pressure restricting valve is tared so as to ensure a minimum pressure level at the terminals of the at least one equipment.

14. The turbopropeller according to claim 8, wherein the at least one equipment is a pitch actuating system.

* * * * *